United States Patent
Kumar et al.

(10) Patent No.: US 10,496,770 B2
(45) Date of Patent: *Dec. 3, 2019

(54) SYSTEM LEVEL SIMULATION IN NETWORK ON CHIP ARCHITECTURE

(71) Applicant: NETSPEED SYSTEMS, San Jose, CA (US)

(72) Inventors: Sailesh Kumar, San Jose, CA (US); Amit Patankar, San Jose, CA (US); Eric Norige, East Lansing, MI (US)

( * ) Notice: Subject to any disclaimer, the term of this patent is extended or adjusted under 35 U.S.C. 154(b) by 525 days.

This patent is subject to a terminal disclaimer.

(21) Appl. No.: 15/265,177

(22) Filed: Sep. 14, 2016

(65) Prior Publication Data

US 2017/0061053 A1 Mar. 2, 2017

Related U.S. Application Data

(63) Continuation of application No. 13/951,098, filed on Jul. 25, 2013, now Pat. No. 9,471,726.

(51) Int. Cl.
*G06F 17/50* (2006.01)
*G06F 15/78* (2006.01)

(52) U.S. Cl.
CPC ...... *G06F 17/5022* (2013.01); *G06F 15/7807* (2013.01); *G06F 17/5009* (2013.01)

(58) Field of Classification Search
CPC .................................................. G06F 17/5022
(Continued)

(56) References Cited

U.S. PATENT DOCUMENTS

| 4,409,838 A | 10/1983 | Schomberg |
| 4,933,933 A | 6/1990 | Dally et al. |

(Continued)

FOREIGN PATENT DOCUMENTS

| CN | 103684961 A | 3/2014 |
| JP | 5936793 | 5/2016 |

(Continued)

OTHER PUBLICATIONS

Ababei, C., et al., Achieving Network on Chip Fault Tolerance by Adaptive Remapping, Parallel & Distributed Processing, 2009, IEEE International Symposium, 4 pgs.

(Continued)

*Primary Examiner* — Hugh M Jones
(74) *Attorney, Agent, or Firm* — Spectrum IP Law Group LLC

(57) ABSTRACT

Systems and methods for performing multi-message transaction based performance simulations of SoC IP cores within a Network on Chip (NoC) interconnect architecture by accurately imitating full SoC behavior are described. The example implementations involve simulations to evaluate and detect NoC behavior based on execution of multiple transactions at different rates/times/intervals, wherein each transaction can contain one or more messages, with each message being associated with a source agent and a destination agent. Each message can also be associated with multiple parameters such as rate, size, value, latency, among other like parameters that can be configured to indicate the execution of the transaction by a simulator to simulate a real-time scenario for generating performance reports for the NoC interconnect.

18 Claims, 15 Drawing Sheets

(58) Field of Classification Search
USPC .......................................................... 703/14
See application file for complete search history.

(56) References Cited

U.S. PATENT DOCUMENTS

| | | | |
|---|---|---|---|
| 5,105,424 A | 4/1992 | Flaig et al. |
| 5,163,016 A | 11/1992 | Har'El et al. |
| 5,355,455 A | 10/1994 | Hilgendorf et al. |
| 5,432,785 A | 7/1995 | Ahmed et al. |
| 5,563,003 A | 10/1996 | Suzuki et al. |
| 5,583,990 A | 12/1996 | Birrittella et al. |
| 5,588,152 A | 12/1996 | Dapp et al. |
| 5,764,740 A | 6/1998 | Holender |
| 5,764,741 A | 6/1998 | Holender |
| 5,859,981 A | 1/1999 | Levin et al. |
| 5,991,308 A | 11/1999 | Fuhrmann et al. |
| 6,003,029 A | 12/1999 | Agrawal et al. |
| 6,029,220 A | 2/2000 | Iwamura et al. |
| 6,058,385 A | 5/2000 | Koza et al. |
| 6,101,181 A | 8/2000 | Passint et al. |
| 6,108,739 A | 8/2000 | James et al. |
| 6,249,902 B1 | 6/2001 | Igusa et al. |
| 6,314,487 B1 | 11/2001 | Hahn et al. |
| 6,377,543 B1 | 4/2002 | Grover |
| 6,415,282 B1 | 7/2002 | Mukherjea et al. |
| 6,674,720 B1 | 1/2004 | Passint et al. |
| 6,711,717 B2 | 3/2004 | Nystrom et al. |
| 6,925,627 B1 | 8/2005 | Longway et al. |
| 6,967,926 B1 | 11/2005 | Williams, Jr. et al. |
| 6,983,461 B2 | 1/2006 | Hutchison et al. |
| 7,046,633 B2 | 5/2006 | Carvey |
| 7,065,730 B2 | 6/2006 | Alpert et al. |
| 7,143,221 B2 | 11/2006 | Bruce et al. |
| 7,318,214 B1 | 1/2008 | Prasad et al. |
| 7,379,424 B1 | 5/2008 | Krueger |
| 7,437,518 B2 | 10/2008 | Tsien |
| 7,461,236 B1 | 12/2008 | Wentzlaff |
| 7,509,619 B1 | 3/2009 | Miller et al. |
| 7,564,865 B2 | 7/2009 | Radulescu |
| 7,583,602 B2 | 9/2009 | Bejerano |
| 7,590,959 B2 | 9/2009 | Tanaka |
| 7,693,064 B2 | 4/2010 | Thubert et al. |
| 7,701,252 B1 | 4/2010 | Chow et al. |
| 7,724,735 B2 | 5/2010 | Locatelli et al. |
| 7,725,859 B1 | 5/2010 | Lenahan et al. |
| 7,774,783 B2 | 8/2010 | Toader |
| 7,808,968 B1 | 10/2010 | Kalmanek, Jr. et al. |
| 7,853,774 B1 | 12/2010 | Wentzlaff |
| 7,917,885 B2 | 3/2011 | Becker |
| 7,957,381 B2 | 6/2011 | Clermidy et al. |
| 7,973,804 B2 | 7/2011 | Mejdrich et al. |
| 8,018,249 B2 | 9/2011 | Koch et al. |
| 8,020,163 B2 | 9/2011 | Nollet et al. |
| 8,020,168 B2 | 9/2011 | Hoover et al. |
| 8,050,256 B1 | 11/2011 | Bao et al. |
| 8,059,551 B2 | 11/2011 | Milliken |
| 8,099,757 B2 | 1/2012 | Riedl et al. |
| 8,136,071 B2 | 3/2012 | Solomon |
| 8,203,938 B2 | 6/2012 | Gibbings |
| 8,261,025 B2 | 9/2012 | Mejdrich et al. |
| 8,281,297 B2 | 10/2012 | Dasu et al. |
| 8,306,042 B1 | 11/2012 | Abts |
| 8,312,402 B1 | 11/2012 | Okhmatovski et al. |
| 8,352,774 B2 | 1/2013 | Elrabaa |
| 8,407,425 B2 | 3/2013 | Gueron et al. |
| 8,412,795 B2 | 4/2013 | Mangano et al. |
| 8,438,578 B2 | 5/2013 | Hoover et al. |
| 8,448,102 B2 | 5/2013 | Kornachuk et al. |
| 8,490,110 B2 | 7/2013 | Hoover et al. |
| 8,492,886 B2 | 7/2013 | Or-Bach et al. |
| 8,514,889 B2 | 8/2013 | Jayasimha |
| 8,541,819 B1 | 9/2013 | Or-Bach et al. |
| 8,543,964 B2 | 9/2013 | Ge et al. |
| 8,601,423 B1 | 12/2013 | Philip et al. |
| 8,619,622 B2 | 12/2013 | Harrand et al. |
| 8,635,577 B2 | 1/2014 | Kazda et al. |
| 8,661,455 B2 | 2/2014 | Mejdrich et al. |
| 8,667,439 B1 | 3/2014 | Kumar et al. |
| 8,705,368 B1 | 4/2014 | Abts et al. |
| 8,711,867 B2 | 4/2014 | Guo et al. |
| 8,717,875 B2 | 5/2014 | Bejerano et al. |
| 8,726,295 B2 | 5/2014 | Hoover et al. |
| 8,738,860 B1 | 5/2014 | Griffin et al. |
| 8,793,644 B2 | 7/2014 | Michel et al. |
| 8,798,038 B2 | 8/2014 | Jayasimha et al. |
| 8,819,611 B2 | 8/2014 | Philip et al. |
| 9,210,048 B1 | 12/2015 | Marr |
| 9,471,726 B2 * | 10/2016 | Kumar ............... G06F 17/5009 |
| 2002/0071392 A1 | 6/2002 | Grover et al. |
| 2002/0073380 A1 | 6/2002 | Cooke et al. |
| 2002/0083159 A1 | 6/2002 | Ward et al. |
| 2002/0095430 A1 | 7/2002 | Egilsson et al. |
| 2003/0088602 A1 | 5/2003 | Dutta et al. |
| 2003/0145314 A1 | 7/2003 | Nguyen et al. |
| 2004/0049565 A1 | 3/2004 | Keller et al. |
| 2004/0103218 A1 | 5/2004 | Blumrich et al. |
| 2004/0216072 A1 | 10/2004 | Alpert et al. |
| 2005/0147081 A1 | 7/2005 | Acharya et al. |
| 2005/0203988 A1 | 9/2005 | Nollet et al. |
| 2006/0002303 A1 | 1/2006 | Bejerano |
| 2006/0031615 A1 | 2/2006 | Bruce et al. |
| 2006/0075169 A1 | 4/2006 | Harris et al. |
| 2006/0161875 A1 | 7/2006 | Rhee |
| 2006/0206297 A1 | 9/2006 | Ishiyama et al. |
| 2006/0209846 A1 | 9/2006 | Clermidy et al. |
| 2006/0268909 A1 | 11/2006 | Langevin et al. |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0070726 A1 | 3/2009 | Mehrotra et al. |
| 2009/0122703 A1 | 5/2009 | Gangwal et al. |
| 2009/0172304 A1 | 7/2009 | Gueron et al. |
| 2009/0187716 A1 | 7/2009 | Comparan et al. |
| 2009/0187756 A1 | 7/2009 | Nollet et al. |
| 2009/0210184 A1 | 8/2009 | Medardoni et al. |
| 2009/0231348 A1 | 9/2009 | Mejdrich et al. |
| 2009/0268677 A1 | 10/2009 | Chou et al. |
| 2009/0285222 A1 | 11/2009 | Hoover et al. |
| 2009/0300292 A1 | 12/2009 | Fang et al. |
| 2009/0307714 A1 | 12/2009 | Hoover et al. |
| 2009/0313592 A1 | 12/2009 | Murali et al. |
| 2010/0040162 A1 | 2/2010 | Suehiro |
| 2010/0158005 A1 | 6/2010 | Mukhopadhyay et al. |
| 2010/0211718 A1 | 8/2010 | Gratz et al. |
| 2010/0223505 A1 | 9/2010 | Andreev et al. |
| 2011/0022754 A1 | 1/2011 | Cidon et al. |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0085550 A1 | 4/2011 | Lecler et al. |
| 2011/0085561 A1 | 4/2011 | Ahn |
| 2011/0103799 A1 | 5/2011 | Shacham et al. |
| 2011/0154282 A1 | 6/2011 | Chang et al. |
| 2011/0191774 A1 | 8/2011 | Hsu et al. |
| 2011/0235531 A1 | 9/2011 | Vangal et al. |
| 2011/0276937 A1 | 11/2011 | Waller |
| 2011/0302345 A1 | 12/2011 | Boucard et al. |
| 2011/0307734 A1 | 12/2011 | Boesen et al. |
| 2011/0320854 A1 | 12/2011 | Elrabaa |

(56) References Cited

U.S. PATENT DOCUMENTS

| | | |
|---|---|---|
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0079147 A1 | 3/2012 | Ishii et al. |
| 2012/0099475 A1 | 4/2012 | Tokuoka |
| 2012/0110106 A1 | 5/2012 | De Lescure et al. |
| 2012/0110541 A1 | 5/2012 | Ge et al. |
| 2012/0144065 A1 | 6/2012 | Parker |
| 2012/0155250 A1 | 6/2012 | Carney et al. |
| 2012/0173846 A1 | 7/2012 | Wang et al. |
| 2012/0195321 A1 | 8/2012 | Ramanujam |
| 2012/0209944 A1 | 8/2012 | Mejdrich et al. |
| 2013/0028090 A1 | 1/2013 | Yamaguchi et al. |
| 2013/0028261 A1 | 1/2013 | Lee |
| 2013/0051397 A1 | 2/2013 | Guo et al. |
| 2013/0054811 A1 | 2/2013 | Harrand |
| 2013/0080073 A1 | 3/2013 | de Corral |
| 2013/0103369 A1 | 4/2013 | Huynh et al. |
| 2013/0103912 A1 | 4/2013 | Jones et al. |
| 2013/0117543 A1 | 5/2013 | Venkataramanan et al. |
| 2013/0148506 A1 | 6/2013 | Lea |
| 2013/0151215 A1 | 6/2013 | Mustapha |
| 2013/0159944 A1 | 6/2013 | Uno et al. |
| 2013/0163615 A1 | 6/2013 | Mangano et al. |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0191572 A1 | 7/2013 | Nooney et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0326458 A1 | 12/2013 | Kazda et al. |
| 2014/0068132 A1 | 3/2014 | Philip et al. |
| 2014/0068134 A1 | 3/2014 | Philip et al. |
| 2014/0092740 A1 | 4/2014 | Wang et al. |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0211622 A1 | 7/2014 | Kumar et al. |
| 2014/0254388 A1 | 9/2014 | Kumar et al. |
| 2015/0043575 A1 | 2/2015 | Kumar et al. |
| 2015/0109024 A1 | 4/2015 | Abdelfattah et al. |
| 2015/0159330 A1 | 6/2015 | Weisman et al. |

FOREIGN PATENT DOCUMENTS

| | | |
|---|---|---|
| JP | 6060316 B2 | 1/2017 |
| KR | 10-2013-0033898 A1 | 4/2013 |
| KR | 101652490 | 8/2016 |
| WO | 2010074872 A1 | 7/2010 |
| WO | 2013063484 A1 | 5/2013 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Gindin, R., et al., NoC-Based FPGA: Architecture and Routing, Proceedings of the First International Symposium on Networks-on-Chip (NOCS'07), May 2007, pp. 253-262.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA 11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Hestness, J., et al., Netrace: Dependency-Tracking for Efficient Network-on-Chip Experimentation, The University of Texas at Austin, Dept. of Computer Science, May 2011, 20 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

Lin, S., et al., Scalable Connection-Based Flow Control Scheme for Application-Specific Network-on-Chip, The Journal of China Universities of Posts and Telecommunications, Dec. 2011, 18(6), pp. 98-105.

Bolotin, Evgency, et al., "QNoC: QoS Architecture and Design Process for Network on Chip" 2004, 24 pages, Journal of Systems Architecture 50 (2004) 105-128 Elsevier.

Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.

Yang, J., et al., Homogeneous NoC-based FPGA: The Foundation for Virtual FPGA, 10th IEEE International Conference on Computer and Information Technology (CIT 2010), Jun. 2010, pp. 62-67.

Zaman, Aanam, "Formal Verification of Circuit-Switched Network on Chip (NoC) Architectures using SPIN", Oosman Hasan, IEEE © 2014, 8 pages.

International Preliminary Report on Patentability for International Application No. PCT/US2013/064140, dated Apr. 23, 2015, 6 pages.

International Search Report and Written Opinion for PCT/US2014/023625, dated Jul. 10, 2014, 9 pgs.

International Search Report and Written Opinion for PCT/US2014/037902, dated Sep. 30, 2014, 14 pgs.

International Search Report and Written Opinion for PCT/US2014/048190, dated Nov. 28, 2014, 11 pgs.

International Search Report and Written Opinion for PCT/US2014/060745, dated Jan. 21, 2015, 10 pgs.

International Search Report and Written Opinion for PCT/US2014/060879, dated Jan. 21, 2015, 10 pgs.

International Search Report and Written Opinion for PCT/US2014/060892, dated Jan. 27, 2015, 10 pgs.

International Search Report and Written Opinion for PCT/US2014/060886, dated Jan. 26, 2015, 10 pgs.

International Search Report and Written Opinion for PCT/US2013/064140, dated Jan. 22, 2014, 9 pgs.

International Search Report and Written Opinion for PCT/US2014/012003, dated Mar. 26, 2014, 9 pgs.

International Search Report and Written Opinion for PCT/US2014/012012, dated May 14, 2014, 9 pgs.

Decision to Grant for Japanese Patent Application No. 2016-516030 dated Nov. 22, 2016, 3 pages, untranslated, Japan Patent Office.

Office Action for Japanese Patent Application No. 2016-516030 dated Aug. 30, 2016, 2 pages, Japan Patent Office.

(56) References Cited

OTHER PUBLICATIONS

Office Action for Korean Patent Application No. 10-2016-7019093 dated Sep. 8, 2016, 3 pages plus 1 page English translation. KIPO, Korea.
Notice of Allowance for Korean Patent Application No. 10-2016-7019093 dated Dec. 5, 2016, 5 pages. KIPO, Korea.
Notice of Grant for Japanese Patent Application No. 2015-535898 dated Jan. 17, 2017, 3 pages, untranslated. Japan Patent Office.
Office Action for Japanese Patent Application No. 2015-535898 dated Oct. 25, 2016, 2 pages English, 2 pages untranslated copy. Japan Patent Office.

* cited by examiner

SYSTEM LEVEL SIMULATION IN NETWORK ON CHIP ARCHITECTURE

CROSS REFERENCE TO RELATED APPLICATIONS

The present application is a continuation of U.S. application Ser. No. 13/951,098, filed on Jul. 25, 2013, the disclosure of which is incorporated by reference in its entirety for all purposes.

BACKGROUND

Technical Field

Methods and example implementations described herein are directed to interconnect architecture, and more specifically, performing multi-hop transactions performance simulations of SoC IP cores within a Network on Chip (NoC) interconnect architecture.

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is certain amount of heterogeneity (e.g., certain hosts talk to each other more frequently than the others), the interconnect performance may depend a lot on the NoC topology and where various hosts are placed in the topology with respect to each other and to what routers they are connected to. For example, if two hosts talk to each other frequently and need higher bandwidth, they should be placed next to each other. This will reduce the latency for this communication, and thereby reduce the global average latency, as well as reduce the number of router nodes and links over which the high bandwidth of this communication must be provisioned. Moving two hosts close by may make certain other hosts far apart since all hosts must fit into the 2D planar NoC topology without overlapping with each other. Thus, right tradeoffs must be made and the hosts must be placed after examining the pair-wise bandwidth and latency requirements between all hosts so that certain global cost and performance metrics is optimized. The cost and performance metrics can include the average structural latency between all communicating hosts in number of router hops, or the sum of the bandwidth between all pair of hosts and the distance between them in number of hops, or some combination thereof. This optimization problem is known to be non-deterministic polynomial-time hard (NP-hard) and heuristic based approaches are often used. The hosts in a system may vary is shape and sizes with respect to each other which puts additional complexity in placing them in a 2D planar NoC topology, packing them optimally leaving little whitespaces, and avoiding overlapping hosts.

NoC performance simulation is usually performed using models for evaluating various NoC elements such as routers, bridges, and channels. Subsequently representative models for components/cores, also referred to as simulation agents or simply agents hereinafter, which transmit and receive traffic are used to generate traffic stimulus. Agent models attempt to mimic the behavior of real agents/components by generating messages of various sizes and values, at various rates, and having various inter-data intervals destined to various other agents. The rate, interval, value of messages, and the destinations can be varied based on statistical nature of the agent to capture performance behavior under different conditions. During these simulations, all agents that are capable of transmitting messages independently generate messages, which are received by the destination agent. In complex systems, there may be a behavior where a message received by an agent will result in transmission of another message. Furthermore, there may be multiple types of messages that may be generated and destined to various destinations when an agent receives a message. For example, a cache controller may receive a message from a CPU and generate a response message to CPU if there is a cache hit or generate a refill message to memory if there is a miss. Thus, there are multiple message sequences possible from CPU to cache to memory and back.

However in the related art, existing NoC performance simulators do not imitate multipoint inter-dependent message sequence generation behavior and instead stimulate NoC by generating only point-to-point messages independently, i.e. as in the above example, request messages from CPU to cache, response messages from cache to CPU, and refill messages from cache to memory, etc. are generated independently from the respective source agents to the destination agents, forming three independent message flows. The rate, interval, and attributes of these flows are controlled to imitate the correct behavior of the agents. Although such simulation may capture the bandwidth properties of different message flows correctly, the different flows will not be synchronized with each other as they will be in a real system. For instance, it is possible that a refill message will be generated before the request message as they are generated independently.

Few related art NoC simulators may attempt to generate response messages for a request message if requests generate responses deterministically at an agent. However, there are cases wherein upon receiving a message, an agent may generate a message from among multiple types of messages based on the state of the agent, state of the network, transmission protocols and directions being used at that time, and the received message. In these cases, it is non-trivial to generate a response message unless an accurate model of the agent is used. Accurate model of agents may slow down the performance simulation and the overall system model may become complex and tedious to build. Therefore most NoC simulators do not support such designs and rely on only point-to-point message flow generation between hops pairs and simulation.

SUMMARY

The present application is directed to performing multi-message transaction based performance simulations of SoC IP cores within a Network on Chip (NoC) interconnect architecture by accurately imitating full SoC behavior. System of the present invention further comprises implementing simulations to evaluate and detect NoC behavior based on multiple transactions, wherein each transaction comprises one or more messages. Each message, also interchangeably referred to as a hop hereinafter, can include a source agent and a destination agent, which correspond to real scenario components and IP cores. As system traffic typically includes a number of messages across multiple agents, a sequence of such messages spanning across two or more agents can be referred to as a transaction, resulting in a simulation environment comprising multiple transactions, which demonstrate possible scenarios of message flow. In operation, a former message of a transaction upon reaching its destination agent produces the latter message. As transactions may be overlapping with each other, system of the present disclosure allows formation of a directed graph of messages.

Aspects of the present application may include a method that allows performance of simulation of NoC by using multiple transaction sequences, wherein each transaction sequence includes one or more messages across multiple agents. Each message of a transaction sequence can have different properties such as rate, priority, value, data size, and latency, among other such properties. Furthermore, each transaction can also include messages that are spread across different inter-data intervals and have different attributes/properties. According to another aspect, method of the present invention further includes generation of a trace file having multiple entries, wherein each entry, in an embodiment, represents an indication of the starting message of a given transaction and is used to initiate a transaction sequence. Multiple other entries and/or conditions can also be defined in the trace files to help initiate and execute transactions. Various statistical and probabilistic models can be used to determine graph traversal decisions. Based on entries in the trace file, different paths in the transaction sequence graph can be taken and corresponding messages can be generated and simulated. Graph traversal decisions can also be made to depend upon the behavior of various agents and/or based on condition/state of SoC architecture. Furthermore, trace files may contain wait intervals reflecting the rate at which various message sequences are initiated and agent models may also contain rate specification to control the rate at which various messages of the sequence are generated at the source agent and consumed at the destination agent.

Aspects of the present application may include a computer readable storage medium storing instructions for executing a process. The instructions may involve, performance of simulation of NoC by using multiple transaction sequences, wherein each transaction sequence includes one or more messages across multiple agents. With a plurality of transactions being executed in parallel, multiple transactions may have overlapping messages, which can be represented through a transaction sequence graph that represents full transaction sequence of the NoC.

Aspects of the present application may include a system, which may involve a transaction sequence input module configured to receive transaction sequences for a given NoC, a transaction sequence graph generation module configured to generate a sequence graph based on messages in each transaction sequence, a trace file creation module configured to create a trace file indicating starting message for each transaction sequence along with allowing configuration of wait time between execution of one or more transaction sequences, and a transaction simulation module configured to conduct simulation of one or more transaction sequences based on the trace file and generate NoC performance reports.

DETAILED DESCRIPTION

Figure 1A:
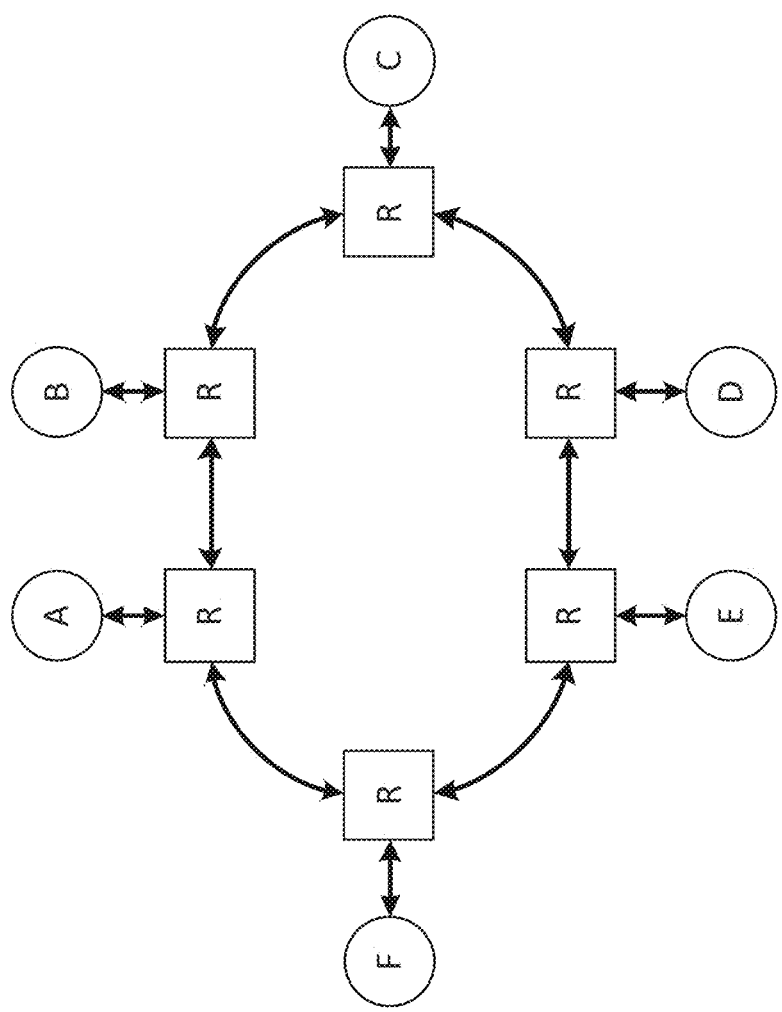
FIGS. 1(a), 1(b) 1(c) and 1(d) illustrate examples of Bidirectional ring, 2D Mesh, 2D Torus, and 3D Mesh NoC Topologies.
Figure 1B:
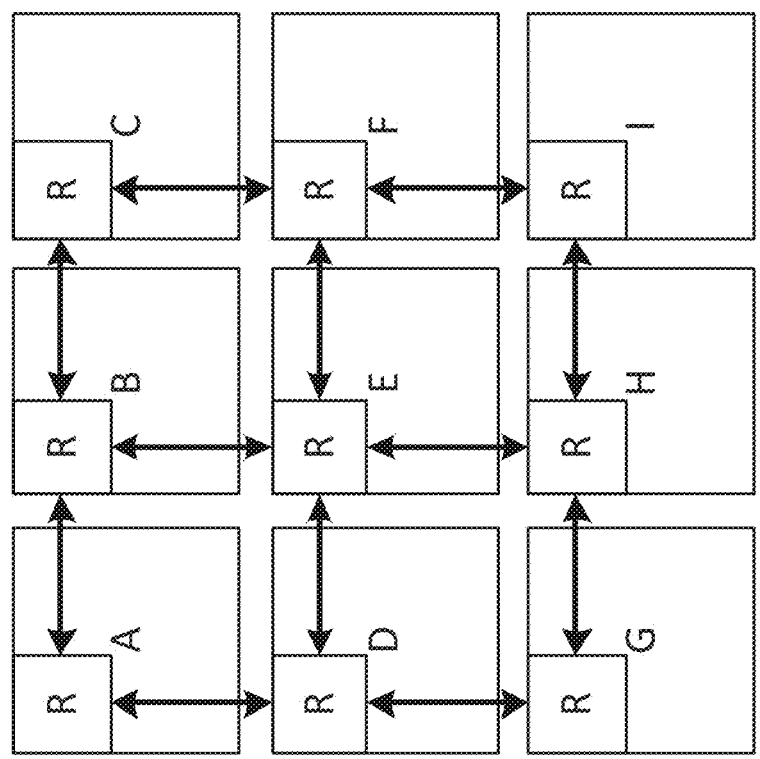
Figure 1C:
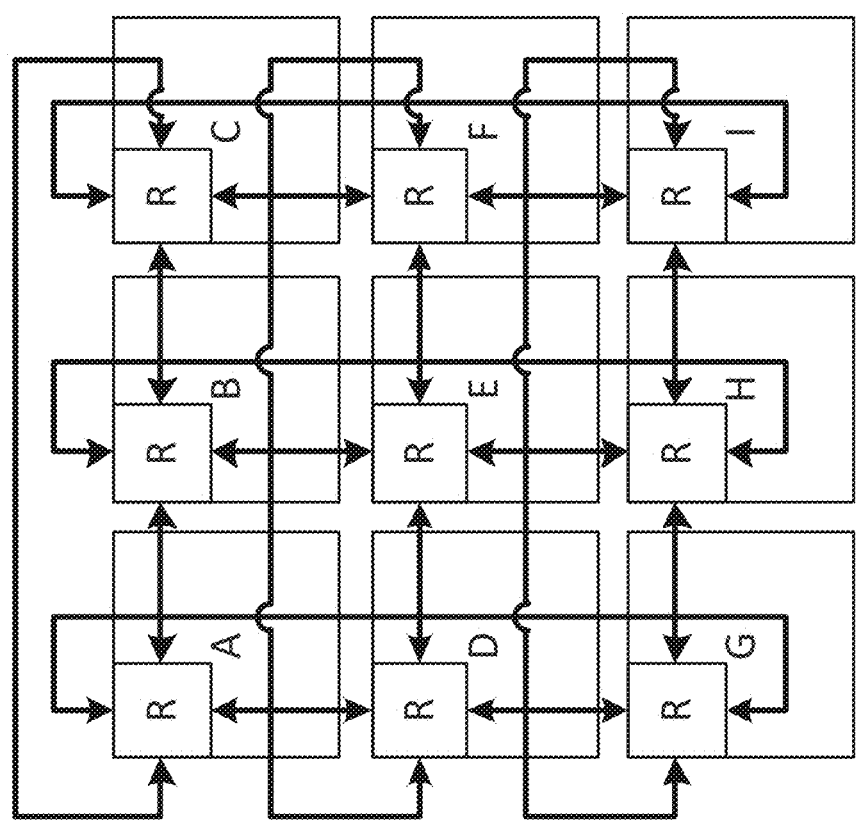
Figure 1D:
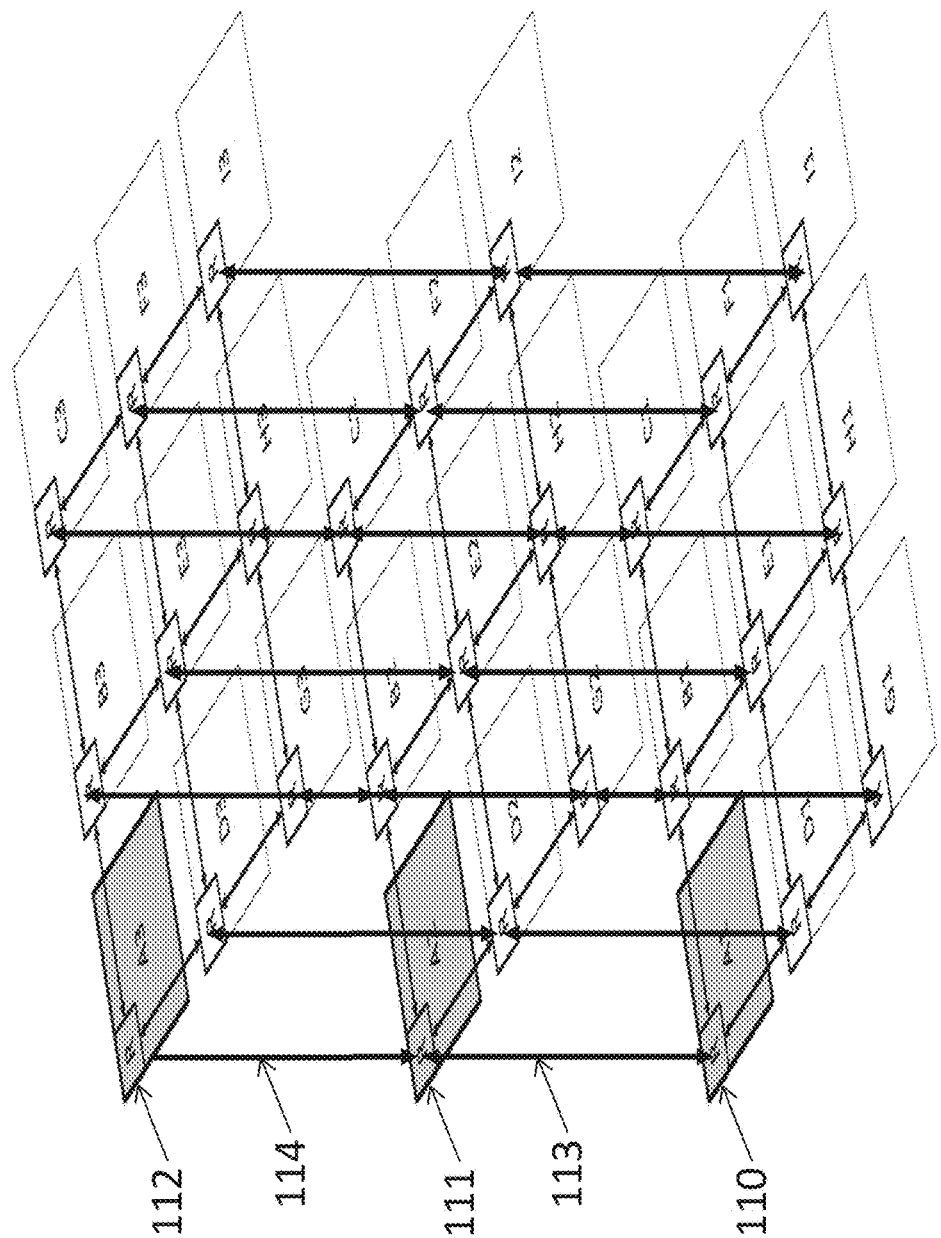
Figure 2A:
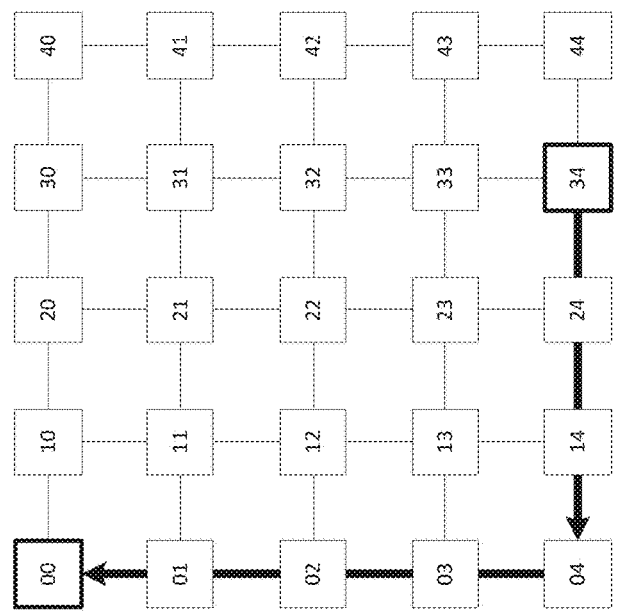
FIG. 2(a) illustrates an example of XY routing in a related art two dimensional mesh.
Figure 2B:
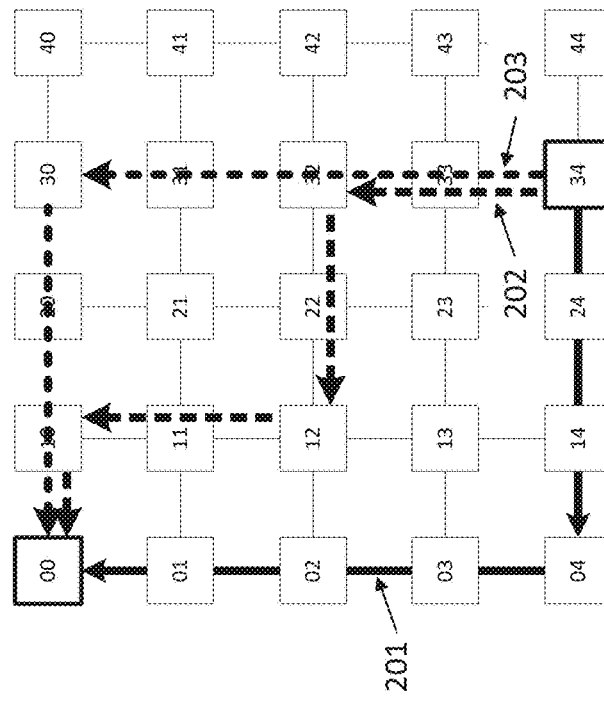
FIG. 2(b) illustrates three different routes between a source and destination nodes.
Figure 3A:
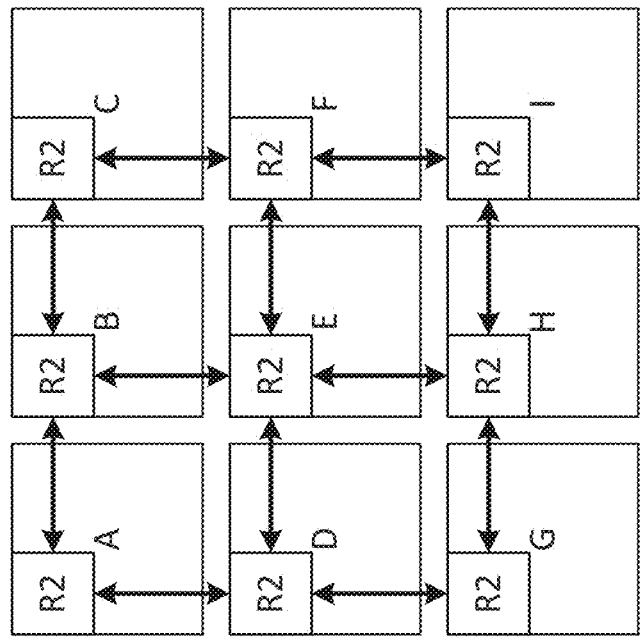
FIG. 3(a) illustrates an example of a related art two layer NoC interconnect.
Figure 3A:
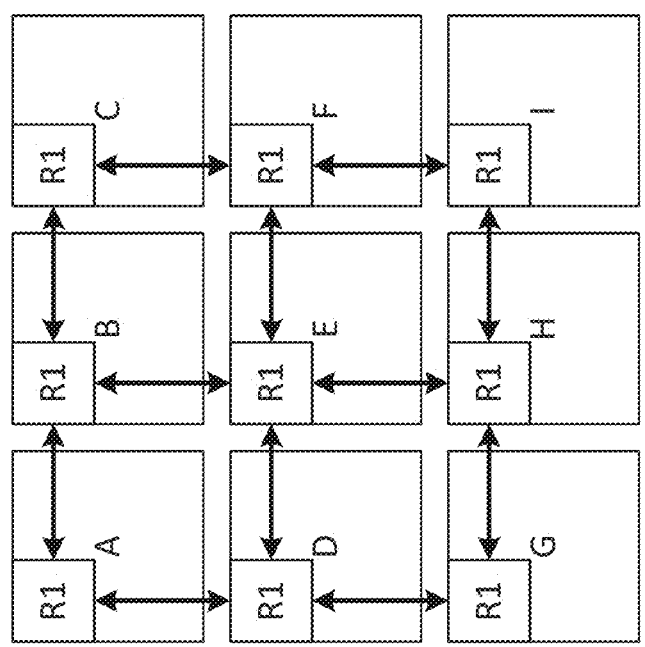
Figure 3B:
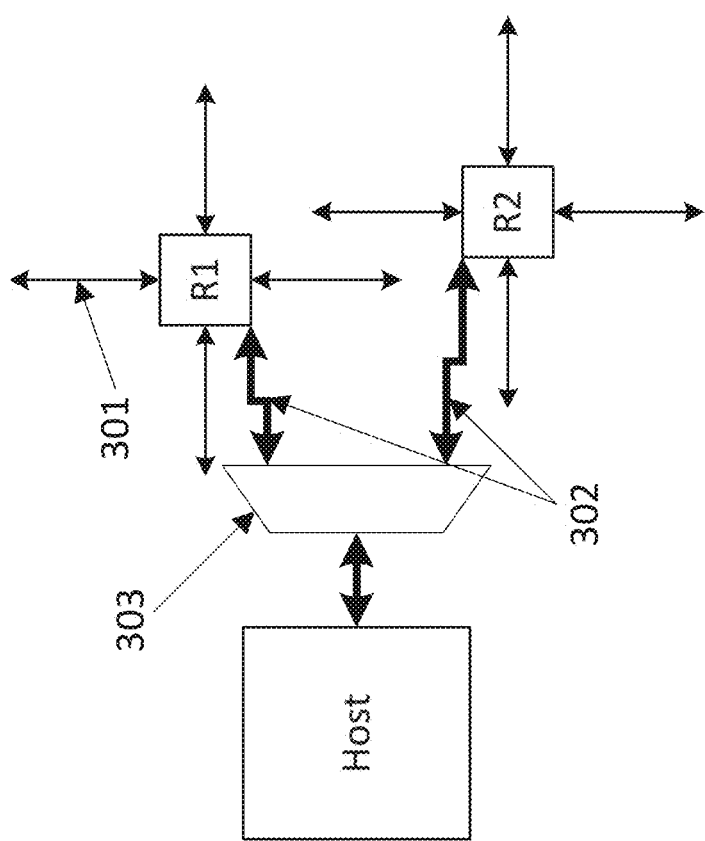
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

A NoC interconnect performance simulation for characterizing and benchmarking a SoC application traffic profile may require support for traffic generation in the NoC interconnect model. While it may be desirable for the traffic generated and consumed by various SoC agents/components connected to the NoC to accurately mimic the application's traffic characteristics, it may be prohibitively complex and slow in terms of simulation speed to accurately model all SoC agents for this purpose. The proposed systems and methods implement techniques and mechanisms for accurately mimicking behavior of SOC IP Cores or components to the extent that NoC performance can be characterized accurately in a SoC.

Figure 4A:
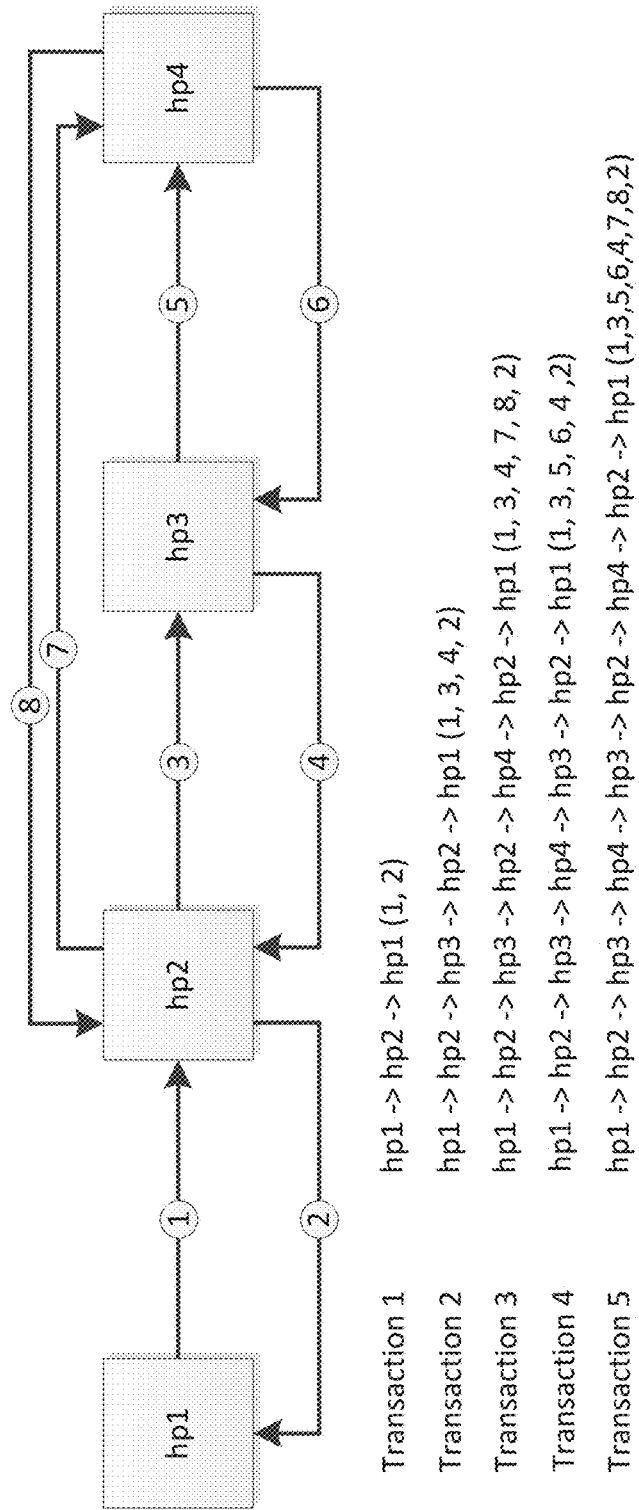
FIG. 4(a) illustrates transaction sequences and messages included in each transaction sequence.

According to one example implementation, for NoC performance characterization, the NoC traffic profile of the SoC can be described using a sequence of messages between various pairs of agent's interfaces. An entire message chain can be referred to as a transaction, and each message can alternatively, also be referred to as a hop. Each hop may have properties such as message data width and length in number of bits, bandwidth specification in terms of average and peak data rates and burstiness levels, latency constraints, or any other constraint on ordering or the route that this message has to take in the NoC. As a result of properties of messages in a transaction, each transaction can also be associated with one or more attributes such as priority, rate, among other applicable attributes. Multiple transactions may have overlapping messages and hence two transactions can have common messages that they traverse through. FIG. 4(a) shows an example system having four agents that are inter-communicating with each other as indicated in the diagram (agents interfaces are not shown), and the messages between them are shown as edges labeled with a number enclosed in a circle. For instance, message sent from source agent hp1 to destination agent hp2 can be referred to as message 1. Likewise, message sent from source agent hp2 to destination agent hp1 can be referred to as message 2.

FIG. 4(a) also illustrates multiple transactions through a graph of messages. To represent this, a user may provide every path of the graph individually as separate transactions. FIG. 4(a) illustrates a total of five transactions, each starting from message 1 between hp1 and hp2, making this hop common among all the transactions. Between various transactions, additional common hops can be present. For instance, transaction 1 indicates message sent from hp1 to hp2 and back from hp2 to hp1. Likewise, transaction 4 represents message sent from hp1 to hp2 to hp3 to hp4 to hp3 to hp2 to hp1 through messages 1, 3, 5, 6, 4, and 2 respectively. Every message of every transaction may be marked with a rate and other message attributes, which indicates how frequently this hop is taken in the actual SoC system. For instance, the rate for the message 1 (from hp1 to hp2) may be higher when compared to other messages as message 1 is used commonly by multiple transactions. The proposed NoC performance simulation mechanism therefore allows full multi-hop transaction specification and simulation to the extent that NoC performance can be fairly characterized without simulating the agent's exact functional behavior.

Figure 4B:
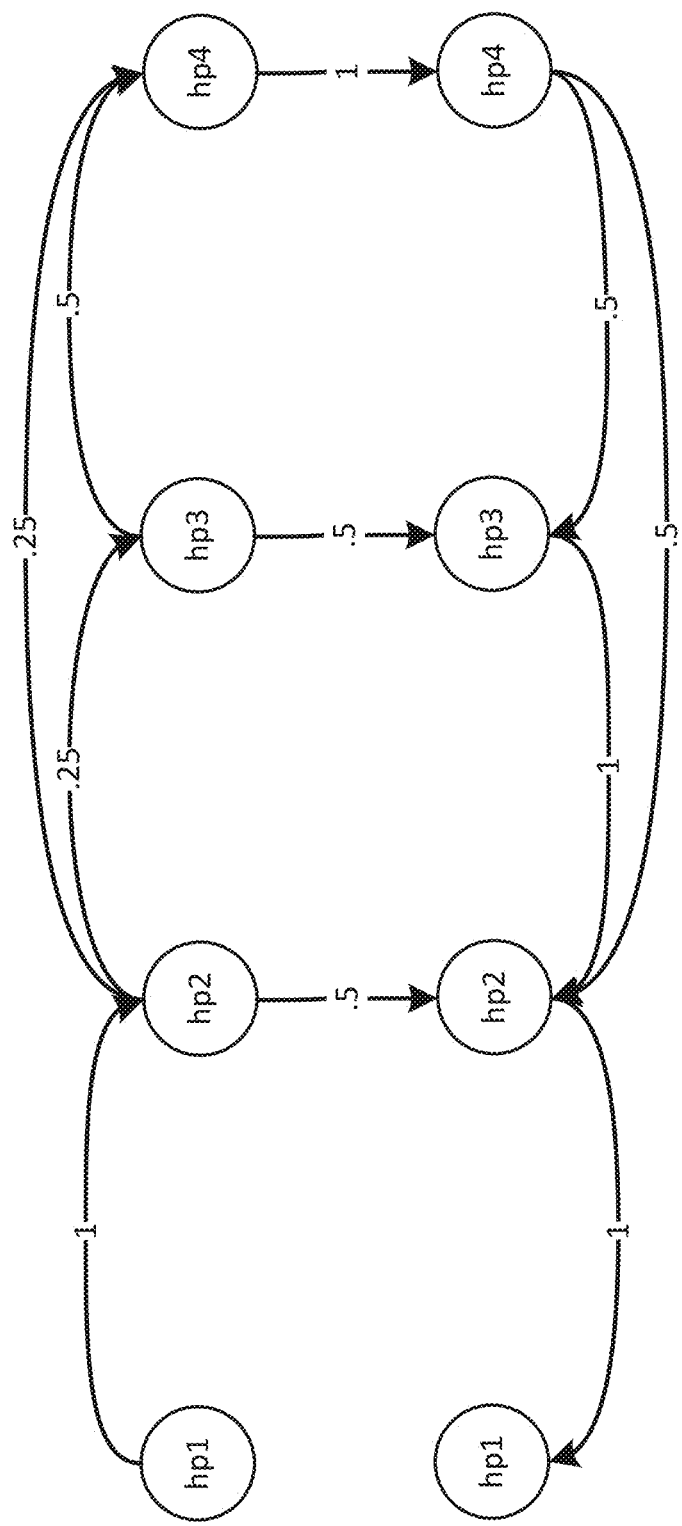
FIG. 4(b) illustrates an example transaction sequence graph having weights associated with each message of a transaction.

According to one example implementation, a graph of the transaction sequences can be constructed indicating agents and/or their interfaces at which the messages are received or transmitted. For instance, for FIG. 4(a), a transaction sequence graph as illustrated in FIG. 4(b) can be generated, wherein each edge represents a message sent from a source agent to a destination agent. As a can be seen, the top row nodes indicate onward transmission of message sequences and the bottom row indicates messages received by backward agents. It should be appreciated that, the transaction sequence graph representation as shown in FIG. 4(b) is an example, and any other graph or representation can be generated to show the sequence of transaction message flow across multiple agents of SoC architecture. In general, a graph may include an agent and/or an agent interface involved in the transaction(s) and messages indicated by edges/arrows that show the source agent and the destination agent for a particular message. An arriving message indicated by an incoming arrow to an agent may result in a departing message indicated by an outgoing arrow from the agent. Graphs can also be configured to include and depict transaction to which a message pertains. In an embodiment, a tree layout based graph can also be generated to represent the agents and messages that they transaction, in which case an agent that acts as a starting point for one or more transactions/messages acts as a root node.

According to one example implementation, as can be seen in FIG. 4(b), weights can be assigned to a message/edge based on the rate and message attribute specification of the respective message of a given transaction. In an instance, if a message is present in multiple transactions (such as hp1 to hp2 of FIG. 4(a)), rates of the message in all transactions may be added to determine the net rate of the message in the graph, or an alternative function may be applied, such as average or max. Allocation of rates to one or more messages of a transaction sequence graph illustrates how frequently the simulation should use the concerned message or hop/edge as it is important to run more simulations on a messages that would be used more frequently in the actual SoC architecture in order to create a real-scenario experience and evaluate behaviors of the NoC performance accordingly. According to one example implementation, once the rates of messages/edges are known, they can be normalized to weights, as are shown in FIG. 4(b). Upon normalization, weights of all incoming edges or all outgoing edges to or from any node can add up to 1. An example weight assignment is shown in FIG. 4(b).

According to one example implementation, once weights are assigned to the transaction sequence graph, the NoC performance simulator can be configured to use these weights to probabilistically determine the path that it may take in the graph during simulation, and generate the appropriate messages accordingly. For instance, with reference to FIG. 4(a), if the message hp2 to hp3 has a weight of 0.25 and the message of hp2 to hp4 has a weight of 0.5, the simulation architecture can implement transaction sequences and messages therein such that the number of messages flows from hp2 to hp4 are double that of those from hp2 to hp3. In another instance, weights can be incorporated in message selection such that, at any given agent, from among all outgoing edges, one is selected based on weight, and the corresponding message is injected into the NoC destined to the agent indicated by the other side of the message. Once this message reaches the destination agent, the outgoing edges of the corresponding node are examined and the next message is generated. When the next message reaches a node where there are no outgoing edges, the transaction is deemed to have been completed. In this implementation therefore, messages with higher weights (which reflect the message rate or frequency of use of such messages in actual SoC system) are followed more frequently, thereby accurately mimicking the bandwidth characteristics of the SoC traffic. Furthermore, since messages that are at the later part of the transaction are generated as a result of the previous message being delivered and consumed by its destination agent, accurate messaging characteristics of the SoC can be emulated.

According to one example implementation, a graph may be constructed where the weight of all outgoing edges from a node is not equal to 1 after normalization, in which case the transaction sequence may terminate at the node or may continue probabilistically based upon the sum of the weight of the outgoing edges from the node. This may occur when a transaction sequence ends at an agent while another transaction sequence reaches the agent but continues on to other agents. For example if there are two transactions with equal rates hp1=>hp2 and hp1=>hp2=>hp3, then at agent hp2, an arriving message may end forming the first transaction, or may continue forming the second transaction. In this case, the outgoing edge from hp2 will have weight 0.5 indicating that the transaction may end at hp2 or continue till hp3 with equal probability.

According to one example implementation, once initiated, transaction sequences can be automatically completed as the simulator of the present disclosure has access to all transaction sequences including message parameters and attributes such as size, value, rate, inter-data intervals, and source-destination information that have been or are defined for the SoC system. However, as each transaction needs to be initiated with the first message of the transaction for injecting the message into the NoC, a trace file can be generated to specify details and attributes of the first message of one or more transactions. Trace files can be configured to describe the first message of a full transaction. One may use trace files for each agent's interface at which some transaction begins. The trace file may contain the first message information of transactions initiated by this agent in the form of a sequence of messages spaced apart with wait intervals to capture the transmission behavior of the agent. A simple trace file example for host hp1 is shown below. The first word indicates the destination of the message followed by properties of the message. Messages are spaced apart by wait intervals.

hp2 [including properties and attributes of the first message]
wait 10
hp3 [including properties and attributes of the first message]
wait 20
hp2 [including properties and attributes of the first message]
hp4 [including properties and attributes of the first message]
wait 20

The above mentioned trace file for hp1 indicates two transactions to hp2, one transaction to hp3 and one to hp4 The two transactions to hp2 can be the same or can be different transactions having a common first message to hp2. Furthermore, the above mentioned trace file indicates a wait time of 10 units between first transaction to hp2 and transaction to hp3 and likewise, no wait time between second transaction to hp2 and transaction to hp4. It would be appreciated that the wait time and properties/attributes of first message of any given transaction can always be modified based on the desired behavior of the NoC interconnect to be monitored. Furthermore, properties of the first and other subsequent messages of a transaction can also be predefined so as to avoid its inclusion in the trace file. Furthermore, as described in further detail below, instead of only the first message of a transaction sequence, the trace file can also be configured to include all message sequences along with their rate/value/size/other attributes.

In another example implementation, when multiple transactions with different first messages begin at an agent, the first message of any transaction may be used at random to initiate the transaction. In another embodiment, each transaction can be selected equally so that even execution of all message sequences is conducted. Alternatively, transactions can also be associated with priorities, which can be computed from weights of their respective messages such that transactions with higher priority can be executed more often than transactions having relatively lower priorities. It would be appreciated that any other algorithm can also be used for running and selecting transaction sequences when such sequences have a common message.

Figure 5:
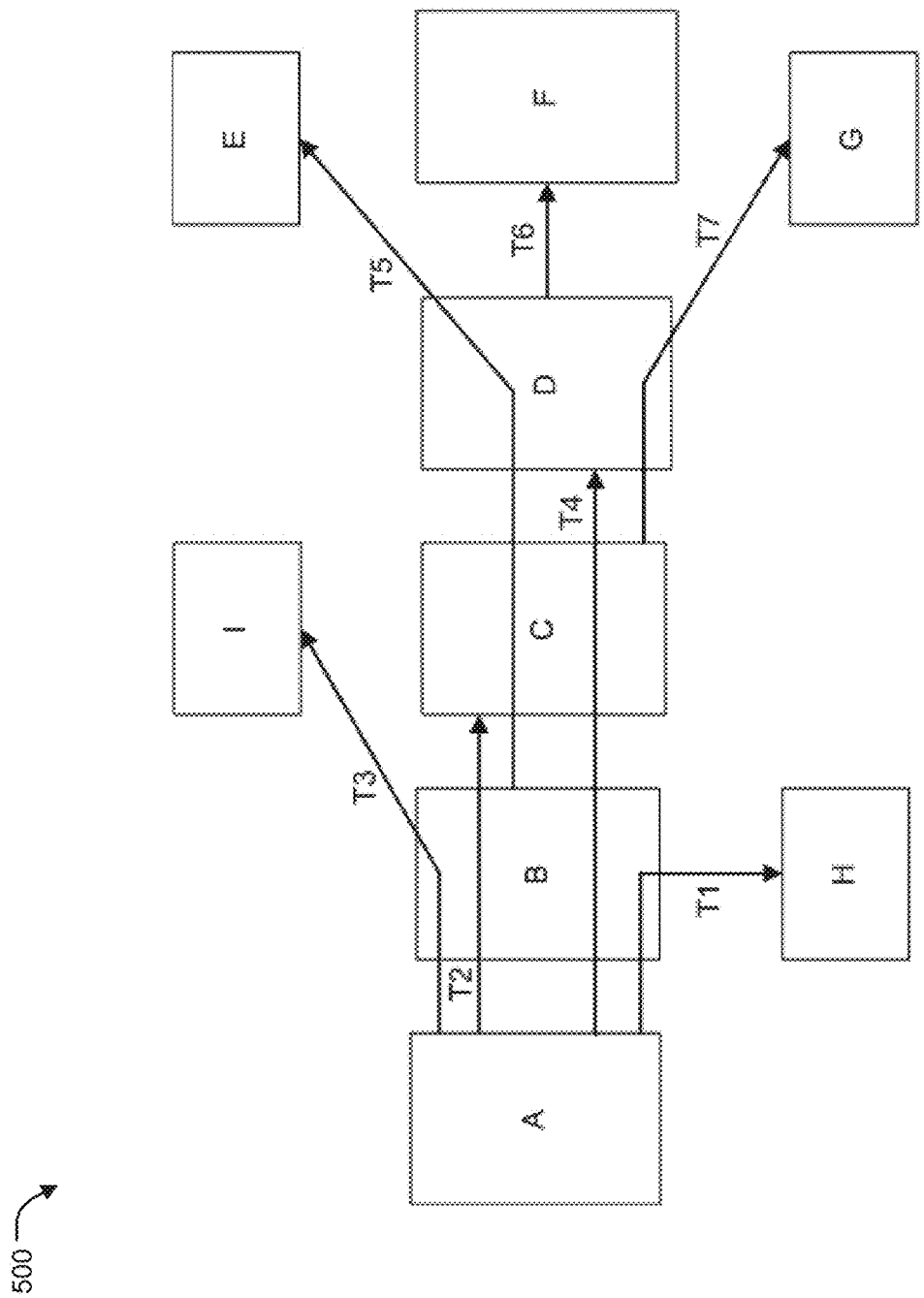
FIG. 5 illustrates an example set of agents and/or agent interfaces showing inter-agent multi-point transactions having a plurality of messages, wherein one or more messages overlap across transactions.

FIG. 5 illustrates an example set of agents and/or agent interfaces 500 showing inter-agent multi-point transactions having a plurality of messages, wherein one or more messages overlap across transactions. The example of FIG. 5 illustrates agents A-I, which may or may not be operatively coupled with each other. The example also illustrates seven transactions namely T1-T7. For instance, T1 traverses from agent A to agent H through agent B. Likewise, transaction sequence T5 traverses from agent B to agent E through agents C and D. Based on the above mentioned transaction sequences, trace files can accordingly be created for agents A, B, C, and D from where one or more transactions are initiated.

As described above, each message of each transaction can be associated with a weight (normalized rate), which may signify the frequency with which (or rate at which) the concerned message would be used in the actual SoC implementation. The weight further defines the transaction and route that would be utilized in case multiple options are present at a given destination node. For instance, if a message from agent A to B is traversed during a simulation, the next possible options available for the simulator can include going to H (transaction T1), going to I (transaction T3), or going to C (transaction T3 or T4). In such a case, any transaction can either be selected at random or periodically to maintain equity in selection, or the weight for each message (B to H, B to I, and B to C) is computed and the message that has the highest rate is selected such that if the weight of message B to C is 0.5, and from B to I is 0.25, and B to H is 0.25, in every four messages at B, two would go to 0.5, one would go to I, and one would go to H, therefore maintaining the ratio based on the weight of the message. Similarly, for a common message from agent C to D, a choice can be made for whether to select next destination agent as E (T5), or select destination agent as F (T6), or select destination agent as G (T7), or whether to stop at D itself (T4). In case the weight of each such option is equal, any random message sequence can be selected or the transaction can actually stop at agent D itself to complete transaction 4. However, it is to be appreciated that this is an example implementation and any other mode and mechanism can be incorporated to select transactions and onward messages.

According to one example implementation, the proposed simulator design may read the trace file at every agent and generate the first messages to the corresponding destination agents and inject the messages into the NoC interconnect. The first messages not only indicate the next destination router but also identify the transaction sequence to which they pertain. The simulator may also automatically determine the remaining hop messages as each hop message reaches its destination. When there are multiple transactions that match at a message (i.e. meet at an agent interface and have the same next message), then one of the messages of a transaction can be picked probabilistically based on the rate of the transactions or messages therein. For example, in FIG. 4(a), when message 1 appears in a trace file, it will match all five transactions. Assuming that the rates of the five transactions are 0.3, 0.3, 0.1, 0.2, and 0.2, message 1 in the trace file can expand to one of the five transactions with these probabilities. If transaction 3 is randomly chosen, then message 1 will be generated at hp1 destined to hp2. At hp2 when this message arrives, it will generate message 3 at hp2 destined for hp3, and so on, until the last message 1 is generated at hp2 destined to hp1.

According to another example implementation, for further control to the user, trace file entries may contain certain message attributes such as number of beats as part of the first message specification. If provided, only those transactions whose attributes match with the specified attributes in the trace file are considered for traffic generation.

Figure 6:
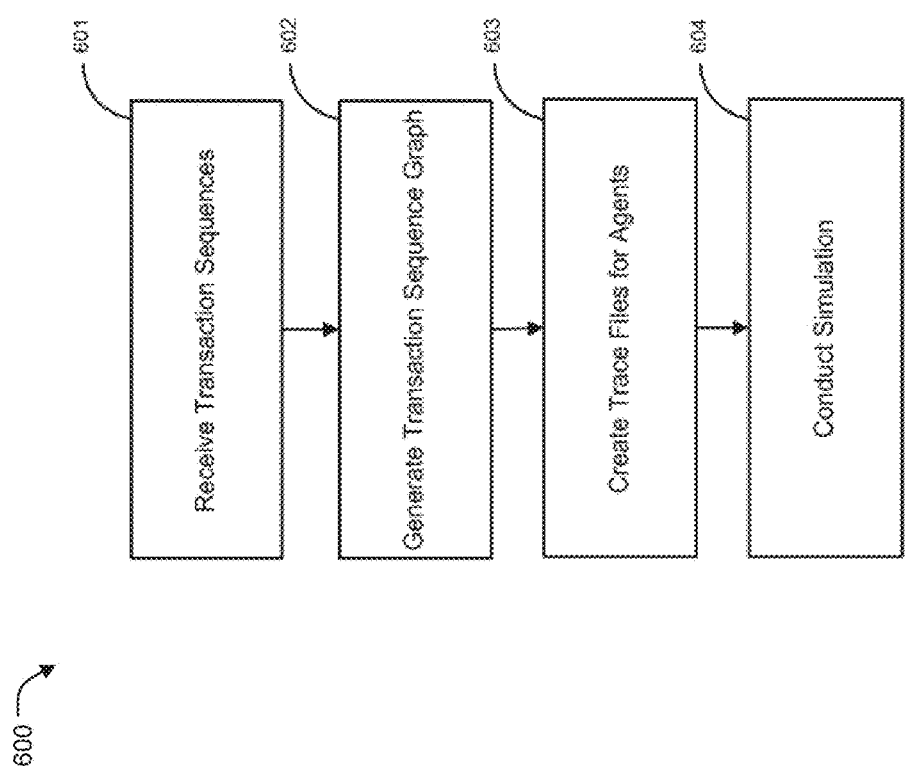
FIG. 6 illustrates a flow diagram of conducting simulations based on received transaction sequences and trace files generated therefrom.

FIG. 6 illustrates a block diagram 600 showing a flow for conducting a simulation in accordance with an example implementation. Block 601 illustrates receiving a set of transaction sequences that are configured to cover and characterize the performance of the NoC interconnect, from which the simulation is conducted. Each transaction sequence can include one or more messages having different or the same properties/attributes, wherein messages of one or more transactions might have common source and destination agents. Block 602 illustrates generation of a transaction sequence graph illustrating interconnection between multiple agents and the messages that they process between themselves. The sequence graph can therefore indicate and pictorially represent the extent to which messages are common across transactions. The graph can further indicate the weight (normalized rate) of each message, wherein a higher weight of a first message indicates a higher probability of the usage of the first message during the simulation runs. Weights can further indicate the number of times the concerned message and/or the transaction that it pertains to would be included during the simulation runs.

Block 603 illustrates creating one or more trace files, wherein each trace file can be created in parallel or sequential in execution to the creation of the transaction sequence graph. The transaction sequence graph may be only for illustrative purpose and can also be omitted. Trace files, on the other hand, can be generated for one or more agents and can, for each of such one or more agents, help indicate the first message of the transactions that are initiated by the concerned agent. Trace files can also be configured in any other manner and, for instance, can be used for setting preconditions that define the kind of transactions that should be executed during simulation. Instead of incorporating only the first message of a transaction, trace files can also include other messages of the transaction along with defining properties and attributes of each message and/or transaction. Trace files can also be edited manually and have delay introduced between execution of multiple transactions. At block 604, the simulation is conducted by using one or more transactions based on their entries in the trace files of multiple agents. The simulation can help generate performance reports that can indicate the characteristic performance of the NoC interconnect.

The proposed simulator design can also automatically generate trace files based on the specification of traffic transactions of the SoC to ease the process of trace file generation. Users can then edit these files further to more accurately reflect the SoC agents behavior if needed. The updated trace files can be reloaded each time a new simulation is started. The generated trace files can account for the transaction rates specified in the specification. Average or peak rate of the transactions in the traffic specification can be used in addition to additional information such as burstiness properties, number of data beats etc. An example implementation of the algorithm used to generate the trace file is described below.

Consider that from an agent I, N transactions begin, i.e. I initiates the first message of N transactions. Let the rate of the $N^{th}$ transaction be $R_n$ in units of messages per cycle. Based on the rates, a list containing first hop messages can be constructed. In this list, the first message of transaction I can be listed $R_1 \times C$ times, the second message can be listed $R_2 *C$ times, and so on, leading to a situation where transactions with higher rates are present more often. For instance, in case agent I initiates 5 transactions to five different destination agents, say D1, D2, D34, D4, and D5. In this implementation, in case the transaction sequence using D1 has the highest rate and the transaction sequence using D4 has the lowest rate, transaction using D1 would have the highest probability of being repeated and therefore when multiplied with C would give the number times the transaction using D1 would be used. For the implementation of the algorithm, C can be a global constant which may be the least common multiple of N integers, where the $i^{th}$ integer is (int)1/Ri, the integer part of 1/Ri. Using the least common multiple will minimize the rounding error due to conversion of floating point Ri to integer count of number of instances of various hops. Subsequently, the list of first hops of various transactions can be normalized by inserting delay intervals to accurately reflect the rate of various transactions. To determine the delay intervals, the rates of all transactions can be added together as $R=\Sigma Ri$. If R is greater than 1, then no delay intervals are needed. If, on the other hand, R is less than 1, messages in the list need to be spaced apart by 1/R cycles of delay. To reduce the rounding error, M/R single cycle wait intervals can be inserted into the list, where M is the total number of message entries in the list. The delay intervals may be uniformly inserted into the list spaced with equal number of message entries or may be randomized.

Figure 7:
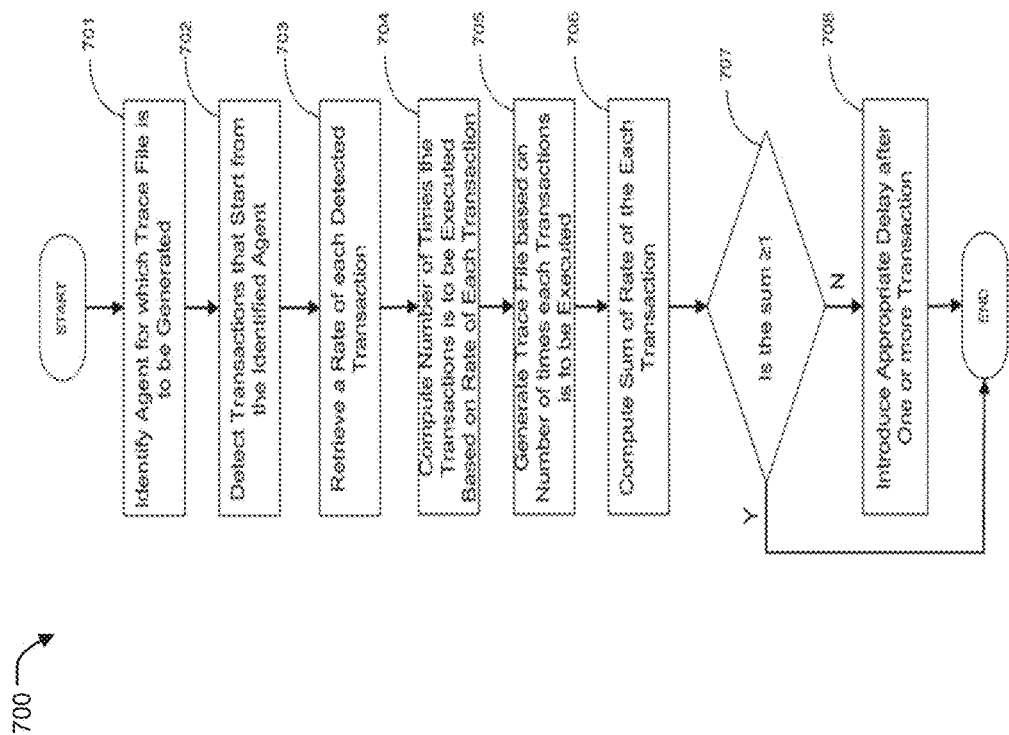
FIG. 7 illustrates a flow diagram for generating a trace file for an agent.

FIG. 7 illustrates an example flow diagram 700 for creation of a trace file. At 701, an agent for which the trace file is to be created/generated is identified. At 702, transactions that start from the identified agent are detected. At 703, the rate of each detected transaction is retrieved to evaluate the number of times the transaction is to be repeated, wherein the rate signifies the probability of choosing the transaction sequence during the actual SoC implementation. At 704, the number of times each transaction sequence is to be executed is determined based on the rate of each transaction and a multiplication factor that facilitates computation of the number of times each transaction is to be executed. At 705, based on the number of times each transaction sequence is to be executed computed in step 704, multiple entries for each transaction are made in a trace file so that the simulation can run each transaction based on its rate or probability of occurrence. At 706, sum of all rates of transactions is computed. At 707, it is determined whether the sum of rates of transactions is greater than 1. At 708, if the sum of rates of transactions is not more than 1 (N), appropriate delay is introduced between transactions to ensure that the sum is at least equal to 1. Otherwise, if the sum of rates of transactions is more than or equal to 1 (N), no delay is to be introduced.

The trace file, along with the indication of the first message of each transaction, can also indicate properties and/or attributes of the first and, if needed, subsequent messages. The above described mode of generating a trace file is an example implementation, and any other format and mode can be used for generating a trace file or for initiating simulation. Another design may therefore use a number of alternative algorithms to generate trace files.

An alternative simulator design may utilize trace files that describe multiple messages for each transaction. In this case, the multiple messages will form prefix of a transaction in the system and only those transactions will be used for simulation that match with the defined prefix. Consider the example shown in FIG. 4(a). If trace file for hp1 contains an entry of hp2, all five transactions will match and any of them can be taken during the simulation based on the probabilistic/rate/weight based model described earlier. However, if the trace file for hp1 contains an entry of "hp2 and hp3", then only the last four transactions will match this entry, and any one of them will be taken at random or based on weights of transactions and/or messages contained therein. The probabilistic model can be adjusted in such a design to correctly determine which paths are taken in the graph. In this design, one may describe the prefix of transactions in the trace file or the full transaction in which case the simulation will be deterministic as only one transaction will match it. Furthermore, intermediate agents can also be mentioned in the trace file such that transactions that traverse through such agents are executed during the simulation process. In sum, the trace file can set any given criterion for execution of one or more transaction and can also define the number of times each transaction is to be executed along with the delays between one or more transactions.

An example simulator design may allow users to create trace files based on traffic transaction specification that is different from the original specification based on which the NoC is designed. This can be useful in performing simulation of the NoC for traffic that is different from the standard traffic. To facilitate the definition of the new transaction specification, the original specification can be written into a text file, which can be edited by a user to make changes to the specification. Users can change the rates of various messages of various transactions as well as other parameters of the hops. Users however might not be able to add a new transaction as it might not be supported in the designed NoC. The edited transaction specification can be loaded and trace files can be automatically generated based on this specification using the algorithm described earlier. Once the new trace files are created, they can reflect the behavior of the new traffic specification and can be used by the simulator for NoC performance simulations. Users can still edit the trace files for further customization in traffic stimulus or revert to the original traffic specification for original simulation. An example implementation of such a simulator is shown in FIG. 8.

Figure 8:
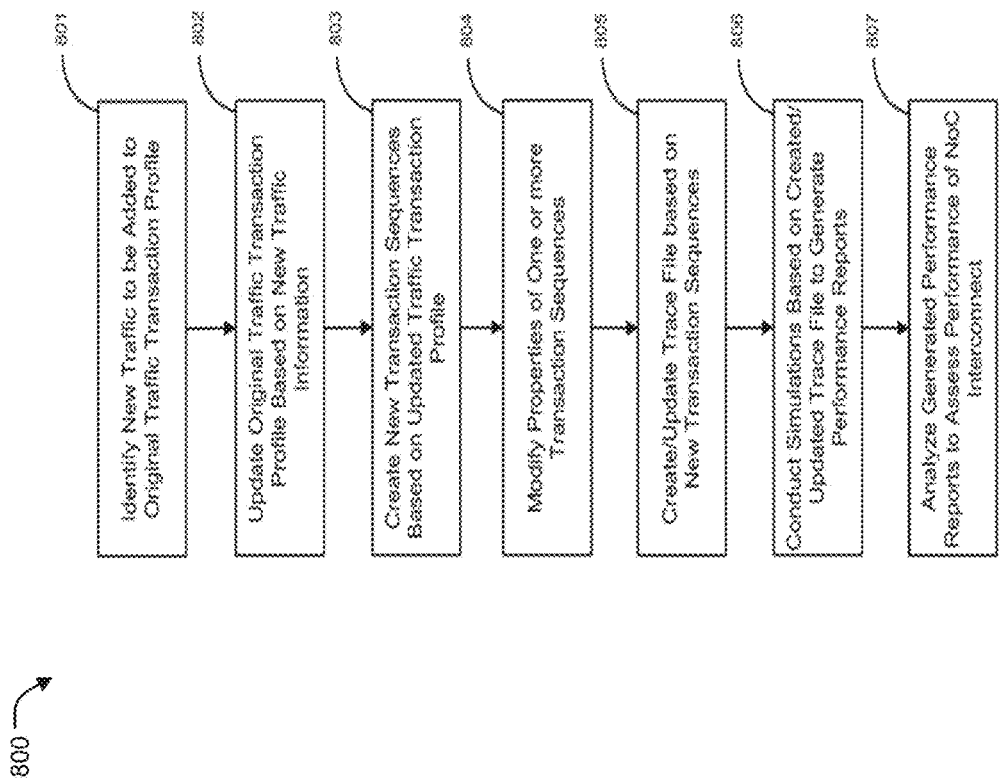
FIG. 8 illustrates a flow diagram for adding and executing new transaction sequences based on new traffic.

FIG. 8 illustrates a flow diagram 800 for which new traffic and possible transaction sequences can be manually added by a user or done automatically. At 801, new traffic is added to the original traffic transaction profile, wherein new traffic can indicate new transactions between agents/components/intellectual property (IP) cores that may form part of the future SoC communication. At 802, the original traffic transaction profile is updated based on the new traffic information. At 803, based on the updated traffic transaction profile, new transaction sequences are created. At 804, properties of the transaction sequences can be modified, wherein the step of modifying can include changing the attributes such as rate, size, value, intervals, among other attributes of the messages of each transaction sequence. Transaction sequences and messages therein can also be modified and/or changed by a user at any time in order to customize the simulation run. At 805, the trace file is created or re-generated based on the new transaction sequences and properties thereof. Such trace files can also be amended manually or based on certain predefined criterion to change factors such as delay between transactions, parameters of each transaction/message thereof. At 806, the updated or newly created trace file can then be used for conducting simulation and initiating execution of transaction sequences based on entries therein. At 807, performance reports are generated after each simulation run or a combination of simulation runs to help analyze the performance of the NoC interconnect.

The performance report may include average latency and throughput of the system, pair-wise latency and throughput between various source and destination pairs, distribution of latency, maximum and minimum values etc. The performance report may also include the ratio of throughput received by various source destination pairs, indicating the relative bandwidth received by various hosts in the system. However, the example implementation is not limited thereto, and other performance report information may be substituted therefor or added thereto, without departing from the inventive concept of the example implementation.

Figure 9:
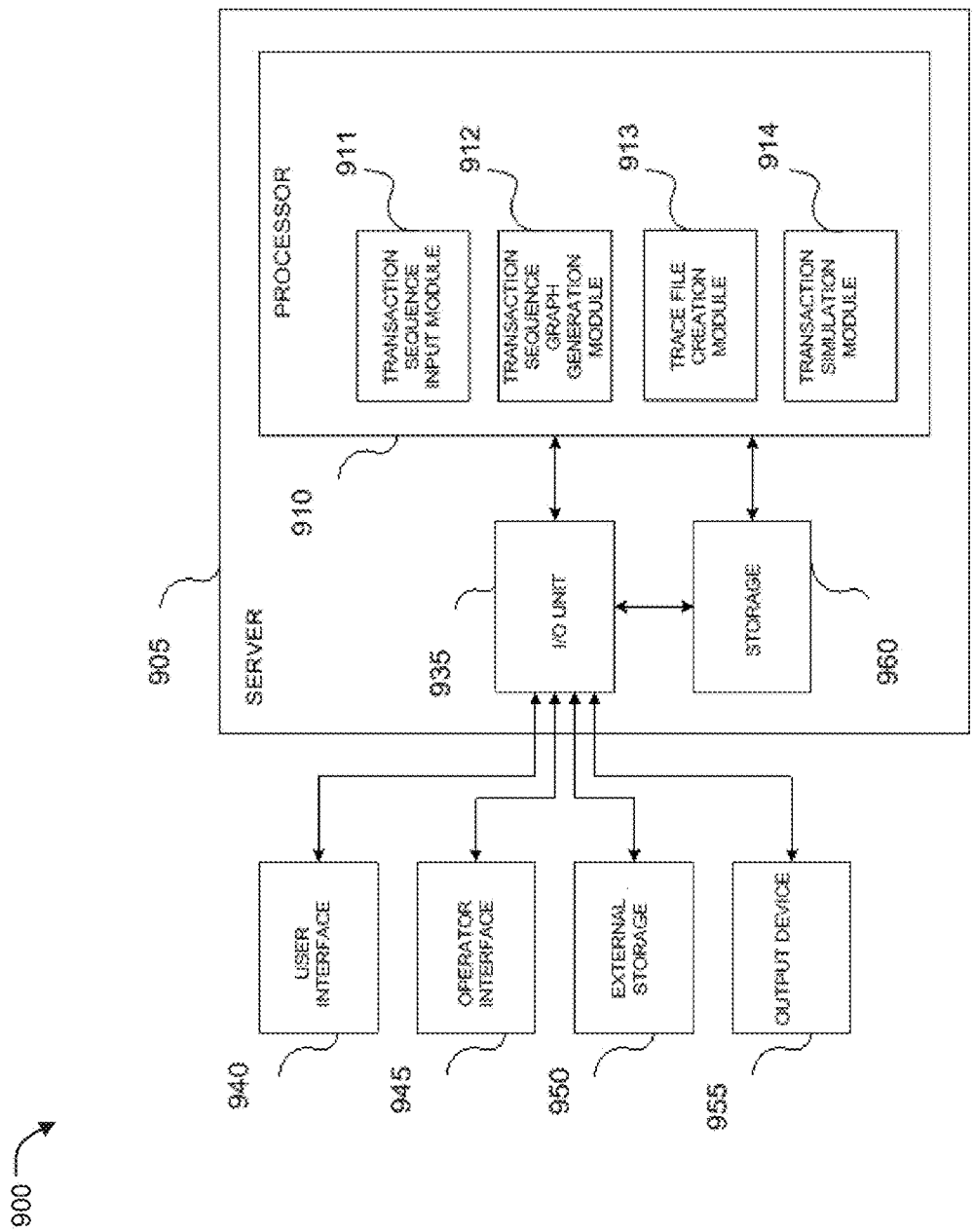
FIG. 9 illustrates a computer/server block diagram upon which the example implementations described herein may be implemented.

FIG. 9 illustrates an example computer system 900 on which example implementations may be implemented. The computer system 900 includes a server 905 which may involve an I/O unit 935, storage 960, and a processor 910 operable to execute one or more units as known to one of skill in the art. The term "computer-readable medium" as used herein refers to any medium that participates in providing instructions to processor 910 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include carrier waves. The I/O unit processes input from user interfaces 940 and operator interfaces 945 which may utilize input devices such as a keyboard, mouse, touch device, or verbal command.

The server 905 may also be connected to an external storage 950, which can contain removable storage such as a portable hard drive, optical media (CD or DVD), disk media or any other medium from which a computer can read executable code. The server may also be connected an output device 955, such as a display to output data and other information to a user, as well as request additional information from a user. The connections from the server 905 to the user interface 940, the operator interface 945, the external storage 950, and the output device 955 may via wireless protocols, such as the 802.11 standards, Bluetooth® or cellular protocols, or via physical transmission media, such as cables or fiber optics. The output device 955 may therefore further act as an input device for interacting with a user.

The processor 910 may execute one or more modules. The transaction sequence input module 911 may be configured to receive transaction sequences for a given NoC. Each transaction sequence may include one or more messages that are configured to go from a source agent to a destination agent. The transaction sequence graph generation module 912 may be configured to generate a sequence graph based on messages and agents involved in each transaction sequence. The trace file creation module 913 may be configured to create a trace file indicating starting message or indicating the destination agent for the first message for one or more transaction sequences along with allowing configuration of wait time between each message and other message attributes. The transaction simulation module 914 may be configured to execute simulation of one or more transaction sequences based on the generated trace file.

The transaction sequence input module 911, the transaction sequence graph generation module 912, the trace file creation module 913, and the transaction simulation module 914 may interact with each other in various ways depending on the desired implementation. For example, the transaction sequence graph generation module 912 takes transaction sequences from input module 911 and, for each transaction sequence, identifies the agents involved in each message of the transaction sequence and creates as sequence graph that indicates all agents along with their messages. Module 912 can further be configured to associate weights to each message of a transaction. Furthermore, trace file creation module 913 takes input from the input module 911 and helps generate a trace file for each agent to include a listing of first messages of each transaction that is to be included. Trace file creation module 913 can also be operatively coupled with transaction sequence graph generation module 912 to add properties for each message in the trace file along with incorporating wait times in the file to enable configuration of the rate at which the transactions can be executed.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A non-transitory computer readable storage medium storing instructions for executing a process, the instructions comprising:

performing, on a computer, a simulation of a Network-on-Chip (NoC) interconnect by using a plurality of transactions, wherein each of the plurality of transactions comprises a sequence of one or more messages, and wherein each of the one or more messages comprises an indication for at least one of a source and a destination agent; and generating subsequent messages in the sequence of the one or more messages for ones of the plurality of transactions based on a first message destination node in the sequence of the one or more messages, wherein the subsequent messages are generated at each destination node of the one or more messages.

2. The non-transitory computer readable storage medium of claim 1, wherein each of the one or more messages comprises an indication for at least one of a rate, a priority, a value, a message data size, latency, and an interval, and wherein messages are used for performing the simulation based on at least one of the rate, the priority, the value, the message data size, the latency and the interval.

3. The non-transitory computer readable storage medium of claim 2, wherein each of the one or more messages comprises an indication for a rate, wherein the rate comprises an indication of a probability of selection of a respective message during the simulation.

4. The non-transitory computer readable storage medium of claim 1, the instructions further comprising generating a trace file for each agent based on the ones of the plurality of transaction sequences that originate from the each agent, wherein the trace file comprises a subset of the one or more messages in the ones of the plurality of transaction sequences.

5. The non-transitory computer readable storage medium of claim 1, the instructions further comprising generating a performance report of the NoC interconnect based on the simulation.

6. A non-transitory computer readable storage medium storing instructions for executing a process, the instructions comprising:
performing a simulation of a Network-on-Chip (NoC) interconnect by using a plurality of transactions, wherein each of the plurality of transactions comprises a sequence of one or more messages, and wherein each of the one or more messages comprises an indication for at least one of a source and a destination agent,
wherein each of the one or more messages comprises an indication for a rate and at least one of a priority, a value, a message data size, latency, and an interval, and wherein the one or more messages are used for performing the simulation based on at least one of the rate, the priority, the value, the message data size, the latency and the interval, and
wherein the rate comprises an indication of a probability of selection of a respective message during the simulation.

7. The non-transitory computer readable storage medium of claim 6, wherein the instructions further comprise generating a trace file for each agent based on the ones of the plurality of transaction sequences that originate from the each agent, wherein the trace file comprises an indication of the one or more messages for each of the plurality of transaction sequences.

8. The non-transitory computer readable storage medium of claim 6, wherein the instructions further comprise generating subsequent messages for ones of the plurality of transaction sequences based on a first message destination node.

9. The non-transitory computer readable storage medium of claim 6, wherein the instructions further comprise generating a performance report of the NoC interconnect based on the simulation.

10. A method, comprising:
performing a simulation of a Network-on-Chip (NoC) interconnect by using a plurality of transactions, wherein each of the plurality of transactions comprises a sequence of one or more messages, and wherein each of the one or more messages comprises an indication for at least one of a source and a destination agent,
wherein each of the one or more messages comprises an indication for a rate and at least one of a priority, a value, a message data size, latency, and an interval, and wherein the one or more messages are used for performing the simulation based on at least one of the rate, the priority, the value, the message data size, the latency and the interval, and
wherein the rate comprises an indication of a probability of selection of a respective message during the simulation.

11. The method of claim 10, further comprising generating a trace file for each agent based on the ones of the plurality of transaction sequences that originate from the each agent, wherein the trace file comprises an indication of the one or more messages for each of the plurality of transaction sequences.

12. The method of claim 10, further comprising generating subsequent messages for ones of the plurality of transaction sequences based on a first message destination node.

13. The method of claim 10, further comprising generating a performance report of the NoC interconnect based on the simulation.

14. A method comprising:
performing, on a computer, a simulation of a Network-on-Chip (NoC) interconnect by using a plurality of transactions, wherein each of the plurality of transactions comprises a sequence of one or more messages, and wherein each of the one or more messages comprises an indication for at least one of a source and a destination agent; and
generating subsequent messages in the sequence of the one or more messages for ones of the plurality of transactions based on a first message destination node in the sequence of the one or more messages, wherein the subsequent messages are generated at each destination node of the one or more messages.

15. The method of claim 14, wherein each of the one or more messages comprises an indication for at least one of a rate, a priority, a value, a message data size, latency, and an interval, and wherein messages are used for performing the simulation based on at least one of the rate, the priority, the value, the message data size, the latency and the interval.

16. The method of claim 14, wherein each of the one or more messages comprises an indication for a rate, wherein the rate comprises an indication of a probability of selection of a respective message during the simulation.

17. The method of claim 14, further comprising generating a trace file for each agent based on the ones of the plurality of transaction sequences that originate from the each agent, wherein the trace file comprises a subset of the one or more messages in the ones of the plurality of transaction sequences.

18. The method of claim 14, further comprising generating a performance report of the NoC interconnect based on the simulation.

* * * * *